United States Patent [19]

Keil et al.

[11] Patent Number: 4,565,558
[45] Date of Patent: Jan. 21, 1986

[54] APPARATUS FOR THE MANUFACTURE OF CONSTRUCTIONS IN FIBERS

[75] Inventors: Rudolf Keil, Munich; Konrad Mathyssek, Zorneding, both of Fed. Rep. of Germany

[73] Assignee: Siemens Aktiengesellschaft, Berlin & Munich, Fed. Rep. of Germany

[21] Appl. No.: 642,583

[22] Filed: Aug. 20, 1984

[30] Foreign Application Priority Data

Sep. 23, 1983 [DE] Fed. Rep. of Germany ....... 3334565

[51] Int. Cl.$^4$ ............................................. C03B 23/08
[52] U.S. Cl. ................................................ 65/1; 65/2; 65/12; 65/61
[58] Field of Search ............................ 65/1, 2, 12, 61

[56] References Cited

FOREIGN PATENT DOCUMENTS

| | | | |
|---|---|---|---|
| 3034873 | 3/1982 | Fed. Rep. of Germany | 65/2 |
| 53-144384 | 12/1978 | Japan | 65/2 |
| 56-57017 | 5/1981 | Japan | 65/12 |

OTHER PUBLICATIONS

Kuwahara et al., "Efficient Coupling from Semiconductor Lasers into Single-Mode Fibers with Tapered Hemispherical Ends", *Applied Optics*, vol. 19, No. 15, Aug. 1, 1980, pp. 2578-2583.

*Primary Examiner*—Robert Lindsay
*Attorney, Agent, or Firm*—Hill, Van Santen, Steadman et al.

[57] ABSTRACT

An apparatus for manufacturing constrictions in fibers characterized by a stretching device for stretching the fiber and a heating device for brief local heating of the stretched fiber to a softening temperature. To improve the reliability and reproducibility of the constrictions formed in the fiber, the stretching device includes an arrangement which limits the maximum stretching force applied to the fiber and includes two exactly aligned guide grooves, which are spaced apart with the heating means disposed therebetween, for positioning the fiber during the heating and stretching steps. To produce the exactly aligned guide grooves, the method includes providing a substrate having a rectilinear guide groove, securing the substrate on a support member and subsequently removing a center portion of the substrate to leave a pair of spaced substrate sections having the aligned grooves.

19 Claims, 4 Drawing Figures

APPARATUS FOR THE MANUFACTURE OF CONSTRUCTIONS IN FIBERS

BACKGROUND OF THE INVENTION

The present invention is directed to an apparatus for manufacturing constrictions in fibers with the apparatus having a stretching device for stretching the fibers by applying a tensile force thereto and a heating installation for brief local heating of a stretched fiber to a softening temperature at which a permanent constriction is formed in the fiber. The tensile force produced in the fiber by the stretching device and the brief local heating are so matched to one another that a constriction is formed in the fiber without tearing or pulling the fiber apart.

For optical communication with monomode glass fibers, transmitting modules are required which modules achieve as high as possible an input coupling efficiency of a laser beam from a semiconductor laser into the monomode glass fiber. A possible coupling optics is a conically tapering fiber end section which is called a tapered end has been heated to form a round lens on the end. Such coupling optics or arrangements are discussed in an article by H. Kuwahara et al, "Efficient Coupling from Semiconductor Lasers into Single-Mode Fibers with Tapered Hemispherical Ends", *Applied Optics*, Vol. 19, No. 15, Aug. 1, 1980, Pages 2578–2583.

To this end, the fiber is, for example, stretched and heated locally by an electrical arc of an arc welder until the attainment of a softening point so that it becomes permanently constricted in the softened region. The cooled constricted fiber is severed approximately at the narrowest point of the constriction and the end of a thus obtained taper is in turn convexly glazed into a lens by use of the arc welder. The point at which the severing is effected in the constriction is fixed by the laser parameters and the fiber parameters which are given by the far field angle of the laser and the core diameter, cladding diameter and refractive index step or jump between the core and cladding for the fiber.

In order to obtain a high coupling efficiency between the laser diode and the monomode or single mode glass fiber to be coupled thereto with as simple as possible an adjustment in which no angular adjustments need be carried out, a far-field distribution, which is symmetrical to the fiber axis, of the coupling optics consisting of a taper with the fused or melted-on lens is necessary. It is to be understood that the far-field distribution of the coupling optics is the far-field of light emerging from the lens at the end of the taper when input coupling is effected via the opposite fiber end. A far-field distribution symmetrical to the fiber axis can be achieved by means of a taper which is as rotationally symmetrical as possible.

SUMMARY OF THE INVENTION

It is the object of the present invention to provide an apparatus with which rotationally symmetrical tapers for fiber ends with definite parameters can be manufactured in a reproducible fashion.

This object is achieved by an improvement in an apparatus for the manufacture of constrictions in fibers, said apparatus comprising stretching means for stretching the fibers by applying a tensile force thereto and heating means for the brief local heating of a stretched fiber to a softening temperature at which a permanent constriction is formed in the fiber, the tensile force produced in the fiber and the brief local heating are so matched to one another that a constriction is formed in the fiber without tearing or pulling the fiber apart. The improvement of this apparatus is that the stretching means includes means for limiting the stretching force of the stretching means and said stretching means includes two exactly aligned guide means for positioning said stretched fiber and means for spacing the two guide means a fixed distance apart on both sides of the location for the heating means.

The inventive apparatus is simple in construction and with this apparatus, rotational symmetrical tapers can be manufactured in the desired shape in a reproducible fashion. The inventive apparatus also guarantees an always uniform distance between a fiber and a constriction in the fiber. Thus, a very simple adjustment of the constriction for a severing operation is provided.

In the preferred embodiments, the means for supporting the two means for guiding is a U-shaped support member with the means for guiding being two guide grooves disposed on the legs of the support member. Preferably, the grooves are formed in plate-shaped substrates which are secured on the end faces of the legs. The plate-shaped substrates can be of an isotropically etchable material such as silicon in which the grooves are etched to have converging side walls which will form either a triangular or trapezoidal cross-section. In another embodiment, the substrates consist of glass in which the grooves have been formed by a cutting operation.

Regardless of the particular material of the substrates, the guide means are preferably provided on the arms of the U-shaped member by providing a plate-shaped substrate with at least one continuous rectilinear guide groove, mounting the plate on the arms of the U-shaped member so that the substrate is attached to the ends of each of the arms and bridges the space therebetween. Then a center section of the substrate is removed so that the remaining sections of the substrate are retained on the support member.

The apparatus also has the means for stretching including first and second means or holding devices capable of moving apart in a longitudinal direction of the two guides at a predetermined drawing speed. Each of the holding devices or means serves the purpose of holding and stretching the fiber and the means for limiting the stretching force includes a frictional locking mechanism for the purpose of restricting the tensile force generated by moving the holding devices apart. This can be a frictional clutch or coupling which is disposed in the output of a drive motor which moves the movable holding means or can be provided by one of the first and second holding means having a clamping jaw which will allow slippage of the fiber once a certain tensile force has been reached. Preferably, the first holding means or device involves one of the guide means which is spaced from the second holding means by the other guide means and has a holding or clamping jaw which clamps the fiber in a groove of the guide means. The other guide means has a clamping jaw which allows frictional movement of the fiber along the guide groove of the guide means. One of the first and second holding means is a movable holding means that has a clamping jaw which will allow frictional movement of the fiber once a specific tensile force has been applied. In each of these embodiments, the jaws are preferably magnets which apply their clamping force by magnetic attraction.

DESCRIPTION OF THE PREFERRED EMBODIMENTS

Figure 1:
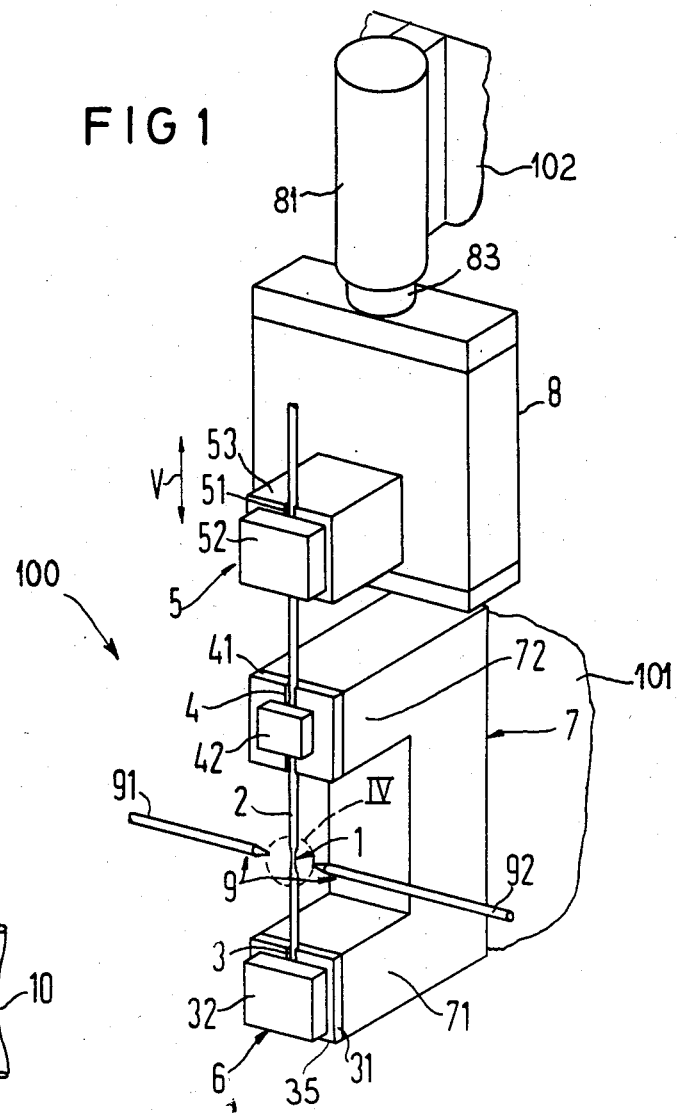
FIG. 1 is a schematic perspective view representing an apparatus for the reproductive manufacture of rotationally symmetrical tapers on a fiber in accordance with the present invention.
Figure 4:
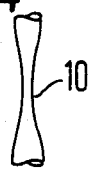
FIG. 4 is an enlarged profile of the constriction of the fiber indicated within the circle IV of FIG. 1.

The principles of the present invention are particularly useful in an apparatus which is generally indicated at 100 in FIG. 1. The device 100 is useful for locally heating portion 1 of a fiber 2 and applying tension forces to the fiber to draw the heated location 1 into a constriction 10, best illustrated in FIG. 4.

The apparatus 100 includes a movable holding means 5 and a fixed holding means 6. As illustrated, the fixed holding means 6 includes guide means which is formed by a guide groove 3 in a substrate 31 which is secured on an end 71 of a U-shaped support member 7. The U-shaped support member 7 has a parallelly extending leg 72 on which a substrate 41 having a guide groove 40 is attached and the grooves 3 and 4 are precisely aligned and form two precisely aligned guides which are in fixed relation to one another for the fiber 2 being stretched in the apparatus 100.

The holding means 6 also includes a relatively strong permanent magnet 32 which is attracted by the support member 7 and acts as a clamping jaw to hold the one end of the fiber 2 in the groove 3. The upper guide groove 4 displaceably supports the fiber 2 by means of a relatively weak magnet 42 which is likewise attracted to the member 7 which is mounted on a member 101 of a frame for the apparatus 100. Above the guide groove 4 there is provided the movable holding means 5 which includes a support member 53 which has an additional V-shaped guide groove 51 for the fiber 2. The groove 51 is essentially in alignment with the two guide grooves 3 and 4. The fiber 2 is securely clamped in this upper guide groove 51 by means of a permanent magnet 52 of relatively average strength with limited clamping force which is attracted to the support member 52. Each of these magnets such as 52, 32 and 42 can be considered as clamping jaws.

The support member 53 is mounted on a slidable table 8 which can be moved in the direction of double arrow V by a drive motor 81 which is attached to another frame member 102 of the apparatus 100. Thus, the upper guide groove 51 which together with the permanent magnet 52 of medium intensity or power forms the holding device or means 5 which is movable relative to the guide grooves 3 and 4 and is thereby capable of moving away in a vertical direction from the lowest guide groove 3 which together with its powerful magnet 32 forms the fixed holding means 6.

Through this movement of the upper holding means or clamping device 5 away from the lower relatively fixed holding means or clamping device 6, a fiber supported in the guide grooves 3, 4 and 51 is stretched. The permanent magnet 52 of medium intensity is weaker in comparison than the more powerful magnet 32 of the fixed holding means and causes the following to occur. Upon movement of the upper clamping device or means 5 away from the lower or fixed clamping device 6, the tensile stress in the fiber 2 reaches a point which is dependent upon the medium intensity of the magnet 52 and the fiber will begin to slide relatively in the upper or movable clamping or holding device 5. However, it will continue to be fixedly supported in the lower or fixed holding means 6. The upper holding means 5 in this fashion forms a limiting force-frictional locking mechanism which limits the maximum amount of tensile stress applied to the fiber 2 whereas the fiber itself will remain unaltered in its position relative to the two guide grooves 3 and 4.

The apparatus 100 will also include a local heating means 9 which is in the form of an AC current arc installation having a pair of electrodes 91 and 92. When the arc between the two electrodes 91 and 92 is ignited, a location 1 of the fiber 2 which is between the two guide grooves 3 and 4 will be heated to a softening point. As the fiber is heated to a softening point, the limiting force-friction of the holding means 5 will again grasp or seize the fiber on account of the yielding of the softened fiber material. The magnetic force of the magnet 52 on the upper clamping means 5 is again sufficient for clamping the fiber 2 in the upwardly moving guide groove 51 and one obtains due to the movement apart of the fiber sections on both sides of the softened location 1 of the fiber 2, a permanent constriction at this location 1. After the disconnection of the arc, the fiber 2 will very rapidly cool in the softened location and the fiber 2 again begins to slide relative through the holding means 5.

Instead of utilizing a limiting force-friction locking mechanism in the form of the holding means 5, a slip friction clutch or coupling 83 which interconnects the output of a drive motor 81 to a sliding table 8 can be utilized. For example, if the drive motor 81 rotates a screw threaded into the table 8, a slip friction clutch can be used to insure that a limited stress is applied on the fiber. In this instance, both the magnet 32 of the lower or fixed holding means 6 as well as the magnet 52 of the upper or movable holding means 5 must be sufficiently powerful so that the friction clutch will slip before the fiber slips relative to either of the holding means 5 or 6.

The steepness or slope of the constriction 10 in the softened location 1 (see FIG. 4) is essentially determined by the electrode distance between the electrodes 91 and 92 which are arranged to extend perpendicularly to the stretched fiber 2. The steepness is also dependent upon the current density of the arc and the drawing speed from which the two clamping or holding means 5 and 6 are moved apart. The length of the constriction 10 is dependent upon the burning duration of the arc and upon the above mentioned drawing speed. All cited parameters can be adjusted so that the shape of the constriction and hence the shape of the taper are reproducible. The force of the permanent magnet 52 on the movable clamping or holding means 5 is uncritical over a wide range and has virtually no influence on the shape of the constriction 10. This can be explained from a rapid temperature increase of the fiber when the arc has been struck or ignited. A more powerful magnet 52 effects only a somewhat earlier commencement of the drawing operation. Excessively great clamping forces in the movable clamping device 5 will cause a tearing-off or breaking apart of the fiber in the constriction 10. By contrast, in the case of an excessively small force which, for example, is less than 1 mN, the drawing of the constriction is no longer possible in a reproducible fashion. For reproducible manufacture of the constriction 10, the tensile force from which the fiber 2 slips through in relation to the clamping or movable device 5 should amount to approximately 0.3N.

The rotational symmetry of the constriction 10 is only guaranteed, if the guide grooves 3 and 4 for the accommodation of the fiber 2 are exactly aligned relative to one another and therefore exhibit no angular offset or axial offset. The present of transverse forces is thereby avoided which faces can cause a lateral bending of the constriction 10 upon softening of the fiber 2. It has been learned that the necessary exact alignment of the guide grooves of the parts which are moved relative to one another is virtually not possible within an adjustable outlay or cost. The utilization of at least two guides 3 and 4 arranged on both sides of the location 1 of the heating of the fiber and fixed relative to one another in an exact alignment for the stretched fiber 2 guarantees a rotational symmetry of the constriction 10.

Figure 2:
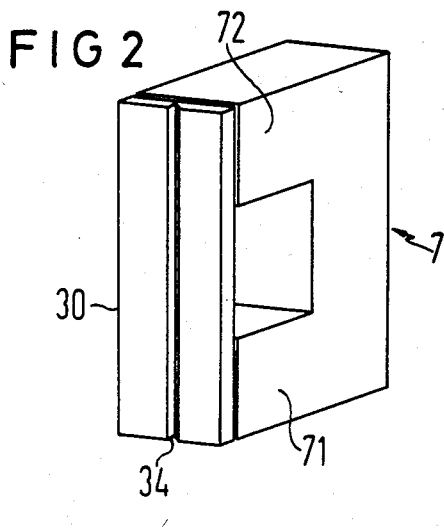
FIG. 2 is a perspective representation of a U-shaped support member whose legs are bridged by a plate with a continuous guide groove.
Figure 3:
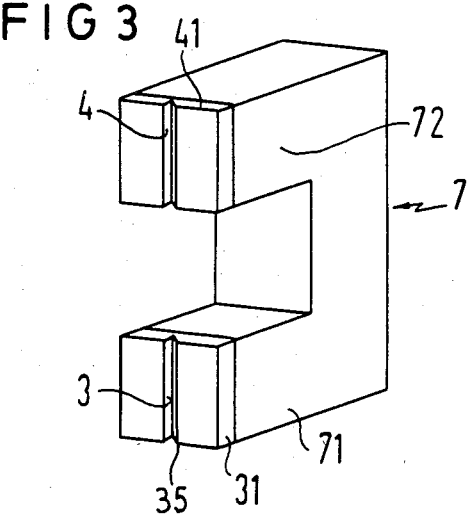
FIG. 3 shows a representation of the support member of FIG. 2 with a center section of the plate having been removed and hence the bridging been interrupted.

The precise alignment of the two guides 3 and 4 can advantageously be achieved according to a method illustrated in FIGS. 2 and 3. A plate 30 with a rectilinear running, continuous V-shaped guide groove 34 is mounted on the end faces of the legs 71 and 72 of the U-shaped support member 7 so that the length of the groove 34 is so dimensioned that together with the plate 30 it bridges the two legs 71 and 72. By cutting out a center section of the plate 30 over an intermediate space between the two legs 71 and 72 of the support member 7 as illustrated in FIG. 3, plates or substrates 31 and 41 with precisely aligned guide grooves 3 and 4 are provided. The V-shaped guide grooves can also have a cross-section with a trapezoidal shape and thus it is desirable that the guide grooves have converging side walls. If the plate 30 is a silicon plate, the grooves such as 34, can be formed by means of etching such as anisotropically etching. If the plate 30 is a glass plate, the groove 34 is formed by means of cutting.

For the manufacture of laser modules, plastic-clad fibers are employed. In the case of the latter, it is necessary that approximately 1 mm thick plastic cladding on the fiber remain up to a point, for example, of 10 mm and less behind the end of the taper. To this end, varyingly deep guide grooves are produced in order to equalize or compensate between the bar fiber with a diameter of 130 μm in the lower guide groove 3 and the plastic cladding in the upper guide which is received in the guide groove 4 of the plate 41 and also the guide groove 51 of the movable holding means.

For the manufacture of a fiber with a taper a constriction 10 must be transversely severed at a location with a specific diameter. This location is difficult to find on account of the shallow angle of the constriction and the gradual transition between the fiber and the constriction. Under the assumption that the end of the fiber to be constricted lies at a definite location relative to the two guide grooves 3 and 4 or at a definite distance from the two guide grooves 3 and 4 and the constrictions are drawn or formed reproducibly, the location for the cut can be readily found through measurement from this fiber end. This can, for example, be achieved by means of a fixed marking arranged at a constant distance from the electrodes 91 and 92 of the heating installation 9. The fiber end is adjusted in relation to this fixed marking prior to the constriction operation. This marking can be an edge 35 on the substrate 31 (see FIGS. 1 and 3).

In the case of an apparatus illustrated in the Figures, the upper clamping or holding device 5 forms the limiting force-friction locking mechanism. Instead of this, however, the apparatus can also be designed so that the lower holding or clamping device 6 forms the limited force friction locking mechanism and the upper clamping device 5 jointly draws the fiber 2 in an upward direction when the latter slips relative to the lower limiting force-friction of the holding mechanism 6. With such an apparatus, relatively thin constrictions 10 can be manufactured because the fiber 2 is still displaced relative to the electrodes 91 and 92 during the softening operation.

It is also possible for the lower holding means 6 to be the movable means as the upper means 5 is held stationary.

Although various minor modifications may be suggested by those versed in the art, it should be understood that we wish to embody within the scope of the patent granted hereon, all such modifications as reasonably and properly come within the scope of our contribution to the art.

We claim:

1. In an apparatus for the manufacture of constrictions in fibers, said apparatus comprising stretching means for stretching the fiber by applying a tensile force thereto and heating means for brief local heating of a stretched fiber to a softening temperature at which a permanent constriction is formed in the fiber, the tensile force produced in the fiber and the brief local heating are so matched to one another that a constriction is formed in the fiber without pulling the fiber apart, the improvements comprising the stretching means including means for limiting the stretching force of the stretching means, two exactly aligned guide means for positioning the fiber being stretched, means for spacing the two guide means a fixed distance apart and on both sides of the location of the heating means, and first and second holding means for holding and stretching the fiber with means for moving the first and second holding means relative to each other, each of the guide means having a guide groove in alignment with the guide groove of the other guide means, and said means for limiting the stretching force including a limiting force-friction lock mechanism to restrict the maximum tensile force being generated by moving the holding means apart.

2. In an apparatus according to claim 1, wherein the means for spacing the two guide means comprises a U-shaped support member having two legs and the guide grooves are provided on the end faces of the two legs.

3. In an apparatus according to claim 1, wherein the means for spacing comprises a U-shaped support member having two parallel legs, and each guide groove is formed in a plate-shaped substrate mounted on an end face of each of said legs.

4. In an apparatus according to claim 3, wherein each of the guide grooves has converging wall surfaces.

5. In an apparatus according to claim 3, wherein each of the substrates consists of an anisotropically etchable material and each of the guide grooves is formed in the material by anisotropic etching.

6. In an apparatus according to claim 5, wherein the anisotropic etchable material consists of silicon.

7. In an apparatus according to claim 3, wherein each of the substrates consist of glass and each of the guide grooves has been cut into said glass.

8. In an apparatus according to claim 1, wherein one of the first and second holding means includes a clamping jaw coacting with a guide groove, each of the guide means includes a clamping jaw coacting with the guide groove of the guide means, wherein the guide groove of one of the guide means is matched to the diameter of a bare section of a coated fiber and the guide grooves of the one holding means and other guide means are matched to the external diameter of the coated fiber.

9. In an apparatus according to claim 1, wherein the limiting force-friction lock mechanism of the means for limiting the stretching force has an upper limit which lies approximately at 0.3N.

10. In an apparatus according to claim 1, wherein the second holding means is designed in the form of a clamping device with a clamping jaw coacting with a guide groove in a support member, said guide groove of the support member being essentially aligned with guide grooves of the guide means, each of said guide means having a clamping jaw associated with the guide groove with the guide means further disposed from said clamping device being the first holding means.

11. In an apparatus according to claim 1, wherein the limited force-friction locking mechanism is provided in one of the first and second holding means.

12. In an apparatus according to claim 11, wherein each of the guide means includes a clamping jaw acting on a fiber in the guide groove to clamp it therein with one of the two guide means being the first holding means, wherein the second holding means of the two comprising a clamping device having a clamping jaw holding the fiber in a guide groove formed in a support member, said limiting force-friction locking mechanism comprising a specifically restricted clamping force acting on a clamping jaw of said one holding means so that the fiber can slide in the holding means once a specific tension is applied thereto.

13. In an apparatus according to claim 12, wherein each of the clamping jaws comprises a magnet with the strength of the magnet of the one holding means having the limiting force-friction locking mechanism being less than the strength of the magnet of the other holding means and the magnet forming the clamping jaw for the other guide means having a strength less than the magnets forming the clamping jaws of the two holding means.

14. In an apparatus according to claim 1, wherein the first holding means is formed by one of the guide means and the other guide means is interposed between the first holding means and the second holding means, said limited force-friction locking mechanism being provided in the second holding means.

15. In an apparatus according to claim 1, wherein the second holding means comprises a clamping jaw coacting with a guide groove in a support member positioned adjacent one of the guide means, the first holding means being the other guide means having a clamping jaw, one of said first and second holding means being a fixed holding means and the other of said first and second holding means being movable thereto, said limiting force-friction locking mechanism being associated with said movable holding means.

16. In an apparatus according to claim 1, wherein the second holding means comprises a locking jaw coacting with a groove in a support member mounted on a sliding table adjacent one of the pair of guide means, said sliding table being moved relative to the guide means along the direction of the fiber by a drive motor, the first holding means of the pair of holding means being the other guide means having a jaw coacting with a groove therein.

17. In an apparatus according to claim 16, wherein the limiting force locking mechanism is formed by means of a friction coupling being disposed in the drive output of the drive motor.

18. In an apparatus according to claim 1, wherein the heating means comprises a pair of arc electrodes adjustably positioned to act on a portion of the fiber extending between the aligned pair of guide means.

19. In an apparatus according to claim 1, which includes a mark being positioned at a fixed distance from the heating means to indicate the position for the end of the fiber which is being acted upon.

* * * * *